June 30, 1970 R. E. RUSSELL 3,518,527
SCR POWER SUPPLY WITH INHERENT LINE REGULATING FEATURE
Filed May 1, 1968 2 Sheets-Sheet 1

INVENTOR
ROBERT E. RUSSELL

BY
Oberlin, Maky, Donnelly & Renner
ATTORNEYS

United States Patent Office 3,518,527
Patented June 30, 1970

3,518,527
SCR POWER SUPPLY WITH INHERENT LINE REGULATING FEATURE
Robert E. Russell, Charlottesville, Va., assignor to Basic Incorporated, Cleveland, Ohio, a corporation of Ohio
Filed May 1, 1968, Ser. No. 725,635
Int. Cl. H02m *1/08*
U.S. Cl. 321—18                    20 Claims

ABSTRACT OF THE DISCLOSURE

A regulated power supply having phase controlled SCR's in a full wave rectification configuration, being triggered by a modified pedestal-cosine ramp signal and utilizing a third SCR as a type of free-wheeling diode. The third SCR is triggered under control of a filter-input voltage integral system to regulate for variations in the alternating current source voltage.

---

This inevention relates to regulated power supplies utilizing solid state components for providing direct current power from an alternating current source and more particularly to regulated power supplies utilizing silicon-controlled rectifiers (SCR's) in a phase triggered arrangement.

SCR supplies are being used extensively; however, a difficulty with these power supplies is their poor regulation for transient rhanges in the alternating current source voltage. Several factors contribute to this deficiency, these being the restricted bandwidth of the control system and the time delay required so that the alternating current power source may commutate the SCR's. It has been usual to limit the bandwidth of the power filter to reduce the effects of power source variations. It has been established that it is not possible to realize a high performance power supply merely by changing the components of the power filter since such approach is only a compromise in sacrificing performance of the system in order to reduce the effect of the source variations. It would be preferable to control the wave-shape occurring prior to the power filter to eliminate the source variations at this point. In using such a method, it would be possible to maintain a wide bandwidth power filter and a corresponding high performance system.

Therefore, it is an object of this invention to provide an improved power supply which diminishes or eliminates the effects of source voltage changes, including transient effects.

It is another object of this invention to provide an improved power supply for a single phase full wave silicon-controlled rectifier circuit which exhibits improved performance for load changes as well as discriminating against input voltage static and transient variations.

It is still another object of this invention to provide an improved power supply utilizing a silicon-controlled rectifier in place of a typical free-wheeling diode for compensating for input source voltage changes and transient effects.

It is still another object of this invention to provide an improved power supply which monitors the integral of voltage applied to the power filter of the supply and utilizes this voltage to control the triggering angle of such free-wheeling SCR.

It is a still further object of this invention to provide an improved power supply which utilizes the integral of voltage applied to the power filter in combination with the difference signal realized from a comparison of the output average voltage signal with a standard reference signal to effect a control against source voltage changes.

It is still another object of this invention to provide an improved power supply which utilizes a novel modified cosine ramp trigger control for the power SCR's.

It is a still further object of this invention to provide an improvd power supply wherein a pedestal-cosine ramp trigger signal is derived from a regulated voltage source not dependent upon the power source to eliminate the effects of voltage changes occurring therein.

It is still another object of this invention to provide an improved power supply which utilizes solid state components entirely and which exhibits an improved performance while regulating against changes in the source voltage.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
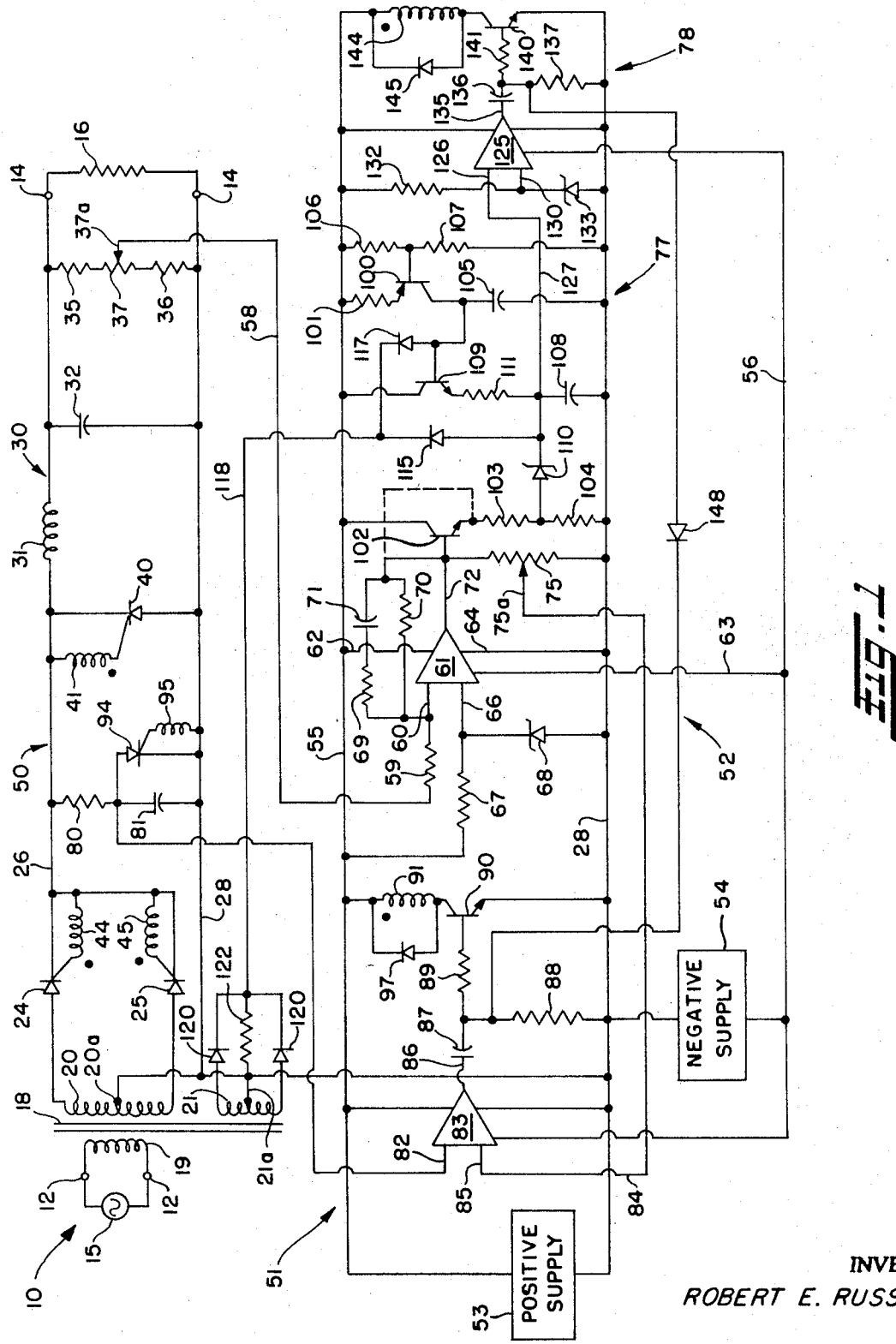
FIG. 1 is a schematic circuit diagram of the preferred embodiment of this invention showing a resistance element as a typical load upon the power supply.

Referring now to FIG. 1, the power supply 10 of this invention is a modification of a standard single phase silicon-controlled rectifier (SCR) supply with free-wheeling diode, having input and output terminals 12, 14 respectively. A conventional AC power source 15 is shown connected to the input terminals 12 of the power supply 10 and may comprise the usual 120 volt 60 cycle AC power. A load 16 shown schematically in the form of a resistor is connected to the output terminals 14 of the power supply 10 and may comprise any form of resistive, capacitive or inductive load or a combination thereof.

A power transformer 18 is provided for isolating the circuit from the power source 15 and consists of a primary winding 19 connected to the power source 15 at terminals 12 and a pair of secondary windings 20, 21 having center taps 20a, 21a respectively. The output leads of secondary winding 20 are connected to the anodes of a pair of SCR's 24, 25 connected in a conventional full wave rectifier configuration having common cathodes for providing a rectified voltage on line 26. The center taps 20a, 21a of the secondary windings 20, 21 of the transformer 18 are connected together and to lines 28 to form a common line for the remainder of the circuitry. The common line 28 may be connected to ground for a reference level or may be left "floating" as shown in FIG. 1 to provide either a positive or negative output from the power supply 10. A power filter 30 consisting of a filter choke 31 connected serially between line 26 and the more positive output terminal 14, and a filter capacitor 32 connected between the output terminals 14 provide a smoothing action for the voltage appearing at the output terminals 14. Further, a voltage divider is connected between the output terminals 14, the divider comprising serially connected resistors 35, 36 and potentiometer 37 having a voltage appearing at the slider 37a corresponding proportionally to the output voltage of the power supply 10 appearing at output terminals 14.

An SCR 40 having its anode connected to the common line 28 and its cathode connected to line 26, thereby being in shunt connection across the input of the power filter 30, takes the place of a conventional free-wheeling diode in similar power supply circuitry. A trigger winding 41, being one secondary winding of a pulse transformer, is connected between the gate terminal of the SCR 40 and line 26 and develops signals for initiating conduction of SCR 40.

Figure 2:
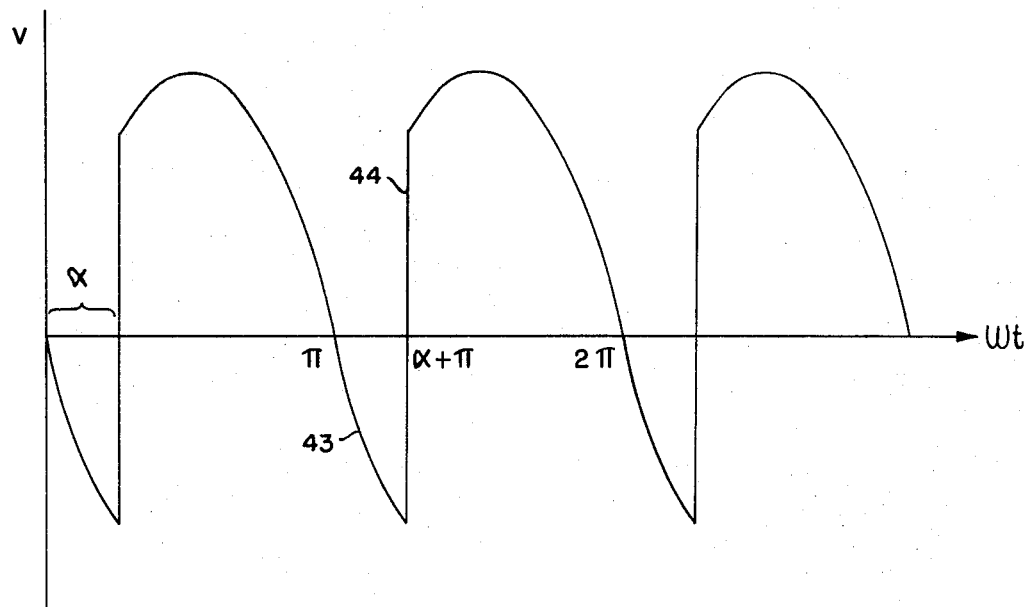
FIG. 2 is a waveform of the voltage occurring within the power supply of this invention at the input to the power filter when no free-wheeling diode or SCR is utilized.

Operation of the circuit in the conventional manner without the benefit of a free-wheeling diode or without triggering of SCR 40 results in the voltage waveform of FIG. 2 appearing at the input to the power filter 30, between line 26 and common line 28. The filter choke 31 has inductance greater than the critical value so that the current through the choke 31 is continuous. When the SCR's 24, 25 are alternately caused to conduct at some trigger angle $\alpha$ within the cycle of the AC power source 15, a negative voltage indicated at 43 will occur for a portion of each cycle. The negative voltage 43 is due to the "holding" current supplied by the choke 31 causing the SCR's 24, 25 to conduct for a portion of the cycle when their anode voltage is negative, thereby causing the cathode voltage, or the voltage at the input to the power filter 30, to become negative also. Thus, if SCR 24 is triggered on at the angle $\alpha$, it will remain conducting until SCR 25 is triggered at the angle $\alpha$ in the next half cycle, causing a rapid switching of the voltage, as indicated at 44, to the positive voltage waveform. The time average value of this voltage is the desired power supply output voltage at terminals 14 and it will be appreciated that the amplitude of the output voltage may be varied or controlled by changing the triggering angle of the SCR's 24, 25. Such average output voltage is sensed by the divider 35, 36, 37 connected across the output terminals 14 and appears as a reduced value at the slider 37a of the potentiometer 37 for comparison with a reference signal and for generation of triggering signals which are applied to trigger windings 44, 45 connected respectively between the gate electrodes of SCR's 24, 25 and line 26. As will be pointed out in greater detail hereinafter, such comparison of output signal with reference signal is performed in conjunction with the generation of a pedestal-cosine ramp signal in a novel circuit which is immune to voltage variations occurring in the AC power source 15.

Figure 3:
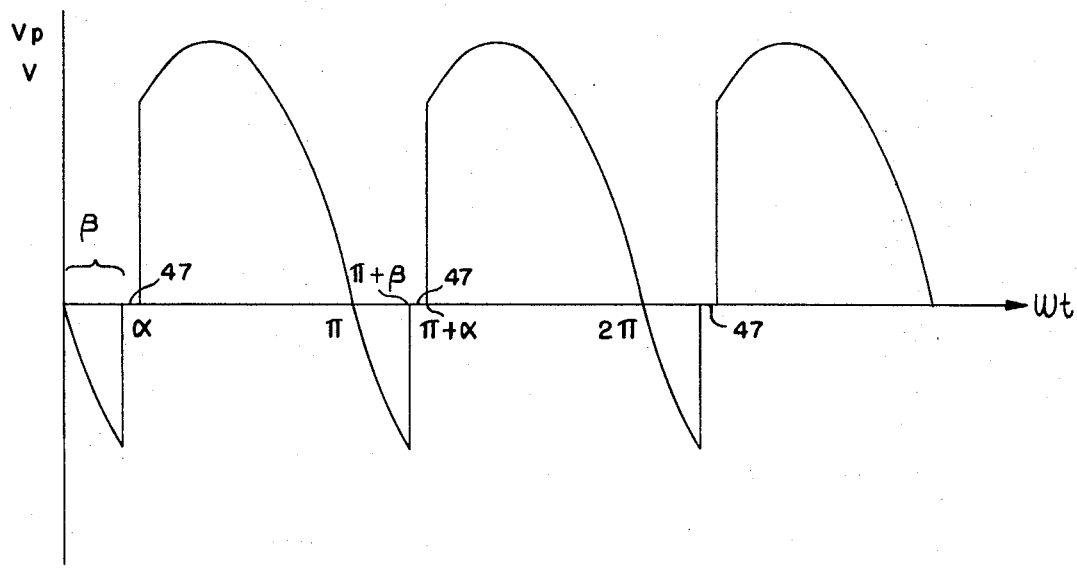
FIG. 3 is a waveshape of a voltage occurring within the circuit of the power supply of this invention at the input to the power filter showing the variation in voltage when the free-wheeling SCR is triggered within its controlled range.

Referring now to FIG. 3, it may be seen graphically how the teachings of this invention are effective to compensate for voltage changes occurring in the power source 15. If the so-called free-wheeling SCR 40 is triggered into conduction at an angle $\beta$, less than angle $\alpha$, the input voltage to the power filter 30 will have the form shown in FIG. 3. The trigger angle $\beta$ controls the interval indicated at 47 for which the integrand of the time average voltage is zero and thus controls the final value of this integration. The time average value of this voltage is the desired output voltage of the power supply 10 occurring at terminals 14. The angle $\beta$ may be adjusted by means of the control circuit to be described hereinafter to make the final value of the integral of the filter input voltage between line 26 and ground 28, over the interval between triggerings at angle $\alpha$ and angle $\beta$ in the next half cycle, a constant, regardless of variations in the peak value of the source voltage 15. Thus, the average of the voltage applied to the filter 30 will remain constant regardless of amplitude variations of the power source 15. In effect then, control over the negative going portion 44 of the waveform is effected to compensate for the variations in the power source 15 and to maintain the average voltage applied to the power filter 30 at a constant value. The free-wheeling SCR 40 provides an alternate path for current flowing through the filter choke 31 and in this embodiment of the invention may be considered as shunting the input of the power filter 30.

Referring again to FIG. 1, the apparatus for controlling the triggering angle $\beta$ of the free-wheeling SCR 40 is shown as comprising integrator 50, comparer 51, and difference amplifier 52. Isolated positive and negative power supplies 53, 54 are provided to supply a positive potential on line 55 and a negative potential on line 56. The supplies 53, 54 are connected to the common line 28 which in turn is connected to the center taps 20a, 21a of the secondary windings 20, 21 of the power transformer 18. As previously described, a voltage proportional to the output voltage of the power supply 10 appears at the slider 37a of the potentiometer 37 and this voltage is applied by way of line 58 through resistor 59 to the inverting input 60 of an operational amplifier 61. The operational amplifier 61 is a conventional high gain, wide bandwidth amplifier which may take the form of any one of many commercially available devices. Power is supplied to amplifier 61 by means of leads 62, 63, 64 connected respectively to the positive and negative voltage lines 55, 56 and the ground line 28. Other operational amplifiers 83, 125 to be described hereinafter are of similar configuration and receive operating power from the same lines of potential 55, 56, 28 on corresponding connecting leads.

The non-inverting input 66 of the operational amplifier 61 is connected through resistor 67 to line 55 and through Zener diode 68 to common line 28 to provide a regulated positive voltage at the input 66 as a reference voltage. A network consisting of resistors 69, 70 and capacitor 71 are connected from the output 72 of the operational amplifier 61 to the inverting input 60 to provide a measure of feedback control, and a potentiometer 75 is connected from the output 72 of the operational amplifier 61 to common line 28. Thus, the operational amplifier 61 acts as a difference amplifier acting upon the signal on line 58 proportional to the average output voltage of the power supply 10 and the reference voltage appearing at the non-inverting input 66 to provide a difference signal at the output 72 proportional to the error of the system and utilizable as a means for controlling the triggering angle $\alpha$ of the SCR's 24, 25 to maintain the output voltage at terminals 14 at a constant value.

Such difference signal at the output 72 of the amplifier 61 is utilized to generate triggering signals in a phase control system comprising a modified pedestal-cosine ramp generator circuit 77 and trigger amplifier circuit 78 which will be described in greater detail hereinafter. The voltage appearing at the slider 75a of the potentiometer 75 is proportional to the error signal appearing at the output 72 of the operational amplifier 61 and provides a control signal for the comparer circuit 51 of the integral control portion of the power supply 10.

The closed loop control effected in part in difference amplifier 61 can be used to adjust the trigger angle $\alpha$ for SCR's 24, 25 to compensate for losses in the power supply components caused by variations in the load 16 on the power supply 10. Since a change in the angle $\alpha$ affects the integral of the voltage applied to the power filter 30, there must, then, by a dependence of the desired value of this integral upon the angle $\alpha$. Thus, control of the integral portion of the circuitry should be referenced in some manner to the trigger angle $\alpha$ and this is accomplished by the use of the voltage appearing at the slider 75a of the potentiometer 75. Also, it is to be noted that voltage drops from the power transformer 18 and SCR's 24, 25 losses are to be compensated in the same manner as variations in the source voltage, basically by the action of the free-wheeling SCR 40, while load 16 and power filter 30 effects are regulated by the power SCR's 24, 25.

Serially connected resistor 80 and capacitor 81 between line 26 and common 28 comprise an integrator circuit, the integral of the voltage between lines 26, 28 appearing across the capacitor 81. This integrated voltage is applied to the inverting input 82 of operational amplifier 83 which is used as a switching device. The slider 75a of potentiometer 75 is connected by way of line 84 to the non-inverting input 85 of the amplifier 83 and the action of the operational amplifier 83 is such that when the voltage at the inverting input 82 becomes more positive than the voltage applied at the non-inverting input 85, the output 86 of the amplifier 83 switches from its positive to its negative maximum value. A circuit consisting of a capacitor 87 connected to the output 86 of the operational amplifier 83 and a resistor 88 connected from the opposite terminal of the capacitor 87 to common line 28 differentiates the output voltage of the amplifier 83 to provide a signal through a series resistor 89 to the base electrode of pulse amplifier transistor 90. The emitter of the NPN type transistor 90 is connected directly to common line 28 and the primary winding 91 of a pulse transformer is connected between the collector of the transistor 90 and the positive voltage line 55. Primary winding 91 and secondary winding 41 are mutually coupled to comprise a part of the transformer which develops trigger signals for free-wheeling SCR 40.

During the positive voltage portion of the cycle, the voltage across capacitor 81 increases. When the voltage at input 82 becomes greater than the voltage at input 85, the output 86 of the operational amplifier 83 will switch from a positive to a negative value and a negative pulse will appear at the base of transistor 90. Thus, no collector current will flow through the primary winding 91 of the pulse transformer.

When, however, the voltage between line 26 and ground 28 becomes negative, the voltage across the integrating capacitor 81 will decrease. As the voltage at the inverting input 82 of the operational amplifier 83 becomes less than the voltage at the non-inverting input 85, the output 86 of the amplifier 83 will switch back from the maximum negative value to the maximum positive value to provide a positive voltage pulse at the base of transistor 90, thereby causing flow of collector current.

A discharge SCR 94 having its anode connected to the junction of resistor 80 and integrating capacitor 81 and its cathode connected to common 28 with another secondary winding 95 of the pulse transformer consisting of windings 41, 91, connected between the gate electrode of the SCR 94 and ground 28 completes the integrator control circuitry. Thus, when a voltage pulse appears across the primary winding 91 of the pulse transformer due to collector current flow through transistor 90, gating signals will be coupled to the secondary windings 41, 95 of the pulse transformer and to the gates of the SCR's 40, 94 respectively, causing conduction of the SCR's 40, 94 if proper anode potential exists. The integrating capacitor 81 will be shunted and discharged by conduction of SCR 94 thereby resetting the integrator circuit 50. SCR 40 will be triggered at the angle β as seen in FIG. 3 and will shunt the negative voltage occurring at that time to the common line 28 potential, thereby controlling the average value of the voltage applied to the power filter 30. Commutation of SCR 40 will be effected by the dissipation of the anode to cathode potential or positively by the forward voltage supplied by the initiation of conduction of the SCR's 24, 25. A diode 97 is connected across the primary winding 91 of the pulse transformer to eliminate the negative voltage which would otherwise appear across the winding when transistor 90 ceases to conduct.

The remainder of the components of the circuit comprise the phase control for the SCR's 24, 25 and regulate the trigger angle α. The output 72 of the reference or differential amplifier 61 is connected to the base electrode of an emitter follower NPN transistor 102 having its collector electrode connected to the positive voltage line 55 and its emitter connected through serially connected resistors 103, 104 to the common line 28. A portion of the output voltage of the reference amplifier appears at the junction of resistors 103, 104 and an alternate connection for the feedback path for the operational amplifier 61 is shown in dashed lines from the emitter of transistor 102.

In order that the power supply 10 output voltage be a linear function of the error voltage, the pedestal-cosine ramp method is used to generate the trigger pulse for the SCR's 24, 25. But the usual method for obtaining the cosine ramp, this being the integration of a full wave rectified sine wave of the power source 15, results in the amplitude of the ramp being dependent upon the amplitude of the line voltage of the power source 15. Therefore, a special circuit is used to generate the cosine ramp.

The circuitry for generating the modified pedestal-cosine ramp for the controlled gating of SCR's 24, 25 is indicated in FIG. 1 generally by the reference numeral 77 and comprises a PNP type transistor 100 connected as a current source, having an emitter resistor 101 connected to the positive voltage line 55 and its collector electrode connected to a capacitor 105 which, in turn, is referenced to common line 28. Conduction bias is provided at the base of transistor 100 by series resistors 106, 107 connected between line 55 and common line 28. It is to be noted that the transistor 100 and thus the current source are energized by the positive power supply 53 which is a regulated source of DC voltage, not sensitive to power line transients. The effect of conduction of transistor 100 is to charge capacitor 105 so that the voltage across capacitor 105 increases linearly with time. The collector of transistor 100 is further connected to the base of an amplifier transistor 109 of NPN configuration having its collector connected to the positive voltage line 55 and its emitter connected through a resistor 111 and a serially connected capacitor 108 to common line 28. The transistor 109, resistor 111 and capacitor 108 form an integrating circuit with current amplification which integrates the linearly increasing voltage appearing across capacitor 105 to provide a parabolically increasing ramp voltage across capacitor 108.

Commonly in these systems, a combination pedestal and cosine ramp may be used as the form of triggering voltage, the variations in height of the pedestal primarily determining the triggering angle α for the controlled rectifiers 24, 25. Such pedestal voltage is provided by Zener diode 110 having its anode connected to the junction of series resistors 103, 104 in the reference amplifier circuit 52 and the cathode of the Zener diode 110 connected to the integrating capacitor 108. The capacitor 108 is charged through the Zener diode 110 to a fraction of the full output voltage of the emitter follower transistor 102 as determined by the relative values of the series resistors 103, 104 to provide the pedestal voltage. Thus, the pedestal voltage from the emitter follower 102 and the cosine voltage derived from the current generator transistor 100 are combined across the integrating capacitor 108 to provide the combination of pedestal plus parabolically increasing ramp voltage. Adjustment of the ramp voltage applied to capacitor 108 is provided by the Zener diode 110 which conducts in the reverse direction when the ramp voltage becomes greater than the pedestal voltage by an amount equal to the Zener voltage. Selection of an appropriate Zener diode 110 is such as to make the ramp voltage occurring across the capacitor 108 the best approximation to the required cosine ramp.

The voltage across capacitor 108 thus comprises an approximation of a cosine voltage which, as is well known in the art, is a preferred form of signal for providing a more linear transformation ratio for the control system. In effect, the cosine configuration of voltage compensates for the sine wave of voltage of the power source 15 applied to the SCR's 24, 25 and provides a more linear operation for the triggering control.

A pair of reset diodes 115, 117 having anodes connected respectively to the integrating capacitor 108 and the linear ramp capacitor 105 and having a common cathode connection are caused to switch once each half cycle by the voltage applied to the cathodes via line 118. Such switching voltage is generated by the full wave rectification of the voltage appearing at the secondary winding 21 of the power transformer 18 by diodes 120 having a common cathode connection and a resistor 122 connected therefrom to the center tap 21a of the secondary winding 21. Thus, the voltage appearing on line 118 is sufficiently positive so as to back bias the reset diodes 115, 117 for the major portion of each half cycle and upon change to common line 28 potential at the end of each half cycle, forward bias the diodes 115, 117 to discharge the positive voltages appearing respectively across integrator capacitor 108 and ramp capacitor 105.

The pedestal cosine ramp signal is compared with a fixed reference signal in the trigger amplifier portion of the circuitry indicated generally at 78 to provide trigger pulses for the SCR's 24, 25 at the appropriate interval within the cycle of the power source 15. The trigger circuitry comprises an operational amplifier 125 receiving at the non-inverting input 126 the voltage appearing across the integrating capacitor 108 via lead 127 and at the inverting input 130 the reference voltage supplied at the junction of serially connected resistor 132 and Zener diode 133 between line 55 and common line 28. When the voltage across the integrating capacitor 108 becomes greater than the voltage across the Zener diode 133, the output 135 of the operational amplifier 125 will switch from its negative maximum value to the positive maximum value.

A differentiation circuit consisting of capacitor 136 and resistor 137 connected to common line 28 generates a positive pulse for application to the base of trigger amplifier transistor 140 through base resistor 141. The trigger transistor 140 is of NPN configuration having its emitter connected directly to line 28 and its collector connected through the primary winding 144 of a pulse transformer to the positive voltage line 55. The pulse transformer comprises primary winding 144 and secondary windings 44, 45 connected between the respective gate electrodes of the SCR's 24, 25 and line 26. As a result of conduction of the trigger transistor 140, pulses will appear at the gate electrodes of the SCR's 24, 25 causing that SCR with a positive anode to cathode voltage to conduct at the appropriate interval within the half cycle. Diode 145 connected across the primary winding 144 of the pulse transformer eliminates any negative voltage from appearing across the winding 144 when the trigger transistor 140 turns off.

A diode 148 is connected between the signal ends of resistors 88, 137 for assuring proper operation of the circuit upon the initial application of power. During such initial period the voltage appearing across capacitor 81 may not be such as to cause amplifier 83 to switch in order to form a trigger pulse at its output. Diode 148, however, insures resetting of the integration capacitor 81 once each half cycle by directing trigger pulses applied toward SCR's 24, 25, to amplifier 90 and thus to SCR 94.

Therefore, it may be seen that the trigger angle α of the SCR's 24, 25 is controlled primarily by the average voltage appearing at the output terminals 14 of the power supply 10 in a novel modified pedestal-cosine ramp control configuration immune to power supply 15 voltage variations, and that the control of the free-wheeling SCR 40 is dependent upon both the average output error signal of amplifier 61 and the integral of voltage applied to the power filter 30 to provide an interrelated and closed loop control system. The primary function of discriminating against power source variations and transients is inherent in this circuit which also exhibits improved performance characteristics for a power supply and novel techniques for control signal generation and application.

It will become apparent to those skilled in the art that many modifications are possible in this system in substituting different types of amplifiers, components and the like and that the teachings of this invention may be varied and applied to different types of power supplies or voltage regulator circuits or any type of circuit which utilizes phase triggering of a controlled rectifier.

It is clear that the control circuitry for SCR's 24, 25 and the control circuitry for SCR 40 may be utilized independently in variations of this invention. However, the circuit described herein is the preferred embodiment of a control circuit for a power supply and in this version utilizes the disclosed combination to provide the advantage of superior regulation of output voltage.

I, therefore, particularly point out and distinctly claim as my invention:

1. In a circuit for controlling current flow wherein a controlled rectifier is triggered into conduction within each cycle of the power source to provide forward current flow to an inductive component, said inductive component creating a holding current flow to maintain said rectifier in conduction beyond reversal of voltage from the power source so as to apply a reverse polarity voltage to said inductive component, the improvement comprising variable impedance means connected between said rectifier and said inductive component in a polarity for shunting such reverse voltage and thus the holding current flow caused by said inductive component, and means for monitoring the average voltage applied to said inductive component in each cycle of the power source and for providing a control signal to said variable impedance means, said signal being effective to control the conductivity of said variable impedance means to maintain the average voltage applied to said inductive component at a desired value.

2. The improvement set forth in claim 1 wherein said monitoring means comprises means for comparing the voltage applied to said inductive component with a reference voltage to provide a difference voltage as the control signal for maintaining the average voltage at a predetermined value.

3. The improvement set forth in claim 2 wherein said variable impedance means is a further controlled rectifier connected in a polarity to shunt holding current flow upon receipt of the control signal at the gate electrode.

4. The improvement set forth in claim 3 wherein said monitoring means comprises a circuit for integrating the voltage applied to said inductive component within each cycle of the power source, said integrated voltage being compared with the reference voltage to provide the control signal for said further controlled rectifier.

5. A power supply for converting the voltage of a power source to a regulated DC voltage comprising a controlled rectifier operative on a phase controlled basis for switching the voltage of the power source for a portion of each cycle, a power filter having an input for receiving the voltage from said controlled rectifier and an output for providing filtered voltage to a load, phase control means for switching said controlled rectifier into operativeness at various angles within the cycle of the power source to maintain a constant voltage at the output of said power filter, said phase control means operative in response to such output load voltage, and means for controlling the average voltage at the input of said power filter, said controlling means being operable in each cycle prior to the switched portion of said controlled rectifier.

6. A power supply as set forth in claim 5 wherein said controlling means comprises means for varying the negative voltage waveform occurring at the input of said power filter at the inital portion of each cycle.

7. A power supply as set forth in claim 6 wherein said varying means comprises a controlled rectifier in parallel connection across the input of said power filter, said controlled rectifier providing a normal high impedance during the charging portion of each cycle and being triggered to a low impedance condition by a control signal, thereby to shunt a portion of the negative voltage occurring at the input of said power filter.

8. A voltage regulator having compensation for input power variations for providing a constant DC voltage to a load, comprising a rectifier operative on a phase-controlled basis for conducting current over a portion of each cycle of the power source, a power filter connected to said rectifier for supplying filtered voltage to a load, first means for controlling the interval of conduction of said rectifier to maintain the output voltage to the load at a constant level, second means connected at the input of said power filter for controlling the voltage thereat during the negative portion of the cycle of the power source, said second means being operative in response to a control signal, and third means for generating said control signal as a function of the integral of the voltage appearing at the input of said power filter whereby such integral value is maintained at a reference level.

9. A voltage regulator as set forth in claim 8 wherein said first means is a detector for providing an error signal indicative of the difference between the output voltage and a predetermined reference voltage and the reference level of said third means is proportional to such error signal.

10. A voltage regulator as set forth in claim 9 wherein said third means comprises a circuit for providing the integral of voltage occurring at the input of said power filter and a comparator for comparing such voltage integral with the error signal of said first means and for providing a control signal to said second means upon attaining a comparison.

11. A voltage regulator as set forth in claim 10 wherein said second means comprises means for shunting the input of said power filter, said shunting means being varied in impedance in response to the control signal of said third means.

12. A voltage regulator as set forth in claim 11 wherein said shunting means is a controlled rectifier and the control signal is a trigger pulse occurring within each cycle at a phase angle when the integral of voltage at the input of said power filter attains a predetermined amplitude relation to the error signal, thereby to effect triggering of said controlled rectifier and shunting of the input of said power filter.

13. A DC voltage regulator having compensation for input voltage changes to provide a constant DC voltage to a load comprising a transformer having a primary winding connected to a source of AC power and at least one secondary winding, a pair of controlled rectifiers connected in full wave rectification configuration to the secondary winding, said rectifiers having a common connection to provide a source of rectified AC voltage, a power filter comprising a series connected input inductor connected to the common connection and a shunt connected capacitor for supplying filtered DC voltage to the load, means for comparing the output voltage across the capacitor with a reference voltage to provide error signals for control of the trigger angles of said controlled rectifiers thereby to maintain the output voltage at a constant level, voltage shunting means connected at the input of said power filter, said shunting means being effective to shunt a portion of the voltage occurring at the input of said power filter upon receipt of a command signal, means connected at the input of said power filter for integrating the voltage occurring thereat and for providing a signal representative thereof, means for comparing the signal of said integrating means with a reference signal to provide a command signal upon comparison thereof, the command signal being connected to control conduction of said voltage shunting means thereby to maintain the average voltage at the input of said power filter at a predetermined level.

14. The voltage regulator as set forth in claim 13 wherein the reference signal is proportional to the error signal of said comparing means and wherein said shunting means is operative only within the portion of the cycle when a voltage of polarity opposite to the rectified AC voltage is applied to the filter.

15. The voltage regulator as set forth in claim 14 wherein said shunting means is a third controlled rectifier connected to the common connection of said pair of controlled rectifiers and having a gate electrode adapted to receive the command signal of said comparing means, said third controlled rectifier being commutated by the initiation of conduction of one of said pair of controlled rectifiers.

16. The voltage regulator as set forth in claim 15 further including means for generating phase-controlled trigger signals for application to said pair of controlled rectifiers, said generating means bein insensitive to input voltage changes and comprising a pedestal generator for providing a voltage having an amplitude proportional to the error signal of said comparing means, means for providing a ramp voltage derived from a regulated power source, and means for combining said ramp and said pedestal voltages and for providing a trigger signal upon attainment of a predetermined triggering level, said trigger signal being applied to said pair of controlled rectifiers to initiate conduction thereof.

17. A circuit for generating variable phase angle trigger signals for controlling the conduction interval of a controlled rectifier within the cycle of a power source, wherein the phase angle is a function of a variable amplitude control signal comprising, a source of regulated voltage, means for generating a ramp voltage from said source of regulated voltage, means responsive to said control signal for generating a pedestal voltage having an amplitude proportional to said control signal, means for summing the ramp and pedestal voltages to provide a combined voltage, means responsive to a predetermined amplitude of said combined voltage for providing trigger signals to initiate conduction of said controlled rectifier, and means connected to said ramp voltage generating means and said summing means for resetting both said means in synchronism with the cycle of power source, said means for generating a ramp voltage comprising a first integrator circuit connected to said source of regulated voltage to provide a ramp signal and a second integrator circuit responsive to the ramp signal to provide a cosine ramp voltage for summation with the pedestal voltage.

18. The trigger circuit as set forth in claim 17 wherein said first integrator circuit comprises a constant current generator energized by said source of regulated voltage and a capacitor connected to be charged by said constant current generator, the voltage across said capacitor increasing linearly with time to provide the ramp voltage.

19. The trigger circuit as set forth in claim 18 wherein said second integrator circuit and said means for summing the ramp and pedestal voltages comprises a common capacitor, the voltage across said common capacitor being the combined pedestal-cosine ramp voltage.

20. The trigger circuit as set forth in claim 19 wherein said means for providing trigger signals comprises an operational amplifier having a reference voltage applied to one input and the combined pedestal-cosine ramp voltage applied to the other input, the output voltage of said operational amplifier switching when the latter applied voltage exceeds the former, a differentiator circuit connected to receive the output voltage of said operational amplifier to provide pulses at the time of switching, and a pulse amplifier connected to said differentiator circuit and operatively connected to the controlled rectifier to initiate conduction of the rectifier.

References Cited

UNITED STATES PATENTS 3,034,037   5/1962   Heightman et al.
3,246,229   4/1966   Lloyd _____ 321—18 XR (Other references on following page)

UNITED STATES PATENTS

| | | | |
|---|---|---|---|
| 3,273,044 | 9/1966 | Clarke | 321—18 |
| 3,305,763 | 2/1967 | Kupferberg et al. | 321—18 XR |
| 3,320,512 | 5/1967 | Kruger | 321—10 |
| 3,323,037 | 5/1967 | Doss | 321—18 XR |
| 3,325,716 | 6/1967 | Gomi | 321—18 XR |
| 3,351,838 | 11/1967 | Hunter | 321—18 XR |
| 3,353,080 | 11/1967 | Santelmann | 321—18 XR |
| 3,418,558 | 12/1968 | Morgan et al. | 321—43 |

WILLIAM M. SHOOP, JR., Primary Examiner

U.S. Cl. X.R.

307—252; 323—22